US012632643B2

(12) United States Patent
Tisa et al.

(10) Patent No.:    US 12,632,643 B2
(45) Date of Patent:    May 19, 2026

(54) METHOD AND SYSTEM FOR AI-BASED REAL-TIME TRANSCRIPTION OF AUDIO DATA

(71) Applicants: Christopher Tisa, Destin, FL (US);
Brandon Diaz, Gulf Shores, AL (US);
Mario Barredo, Granite City, IL (US)

(72) Inventors: Christopher Tisa, Destin, FL (US);
Brandon Diaz, Gulf Shores, AL (US);
Mario Barredo, Granite City, IL (US)

( * ) Notice: Subject to any disclaimer, the term of this patent is extended or adjusted under 35 U.S.C. 154(b) by 142 days.

(21) Appl. No.: 18/895,303

(22) Filed: Sep. 24, 2024

(65) Prior Publication Data

US 2026/0087236 A1    Mar. 26, 2026

(51) Int. Cl.
| | |
|---|---|
| *G10L 15/26* | (2006.01) |
| *G06F 16/334* | (2025.01) |
| *G06F 40/166* | (2020.01) |
| *G06V 40/16* | (2022.01) |
| *G06V 40/70* | (2022.01) |
| *G10L 17/02* | (2013.01) |
| *G10L 17/10* | (2013.01) |

(52) U.S. Cl.
CPC ........ *G06F 40/166* (2020.01); *G06F 16/3347* (2019.01); *G06V 40/168* (2022.01); *G06V 40/70* (2022.01); *G10L 17/02* (2013.01); *G10L 17/10* (2013.01)

(58) Field of Classification Search
CPC ......... G06F 40/279; G06F 40/35; G10L 15/26
See application file for complete search history.

(56) References Cited

U.S. PATENT DOCUMENTS

| | | | | |
|---|---|---|---|---|
| 9,300,790 B2 * | 3/2016 | Gainsboro | .............. | G10L 17/00 |
| 9,460,719 B1 * | 10/2016 | Antunes | ................. | G06Q 10/10 |
| 9,852,732 B2 * | 12/2017 | Chavez | ................... | G10L 15/26 |

(Continued)

*Primary Examiner* — Daniel Abebe
(74) *Attorney, Agent, or Firm* — The Rapacke Law Group, P.A.

(57) ABSTRACT

A system for an automated real-time transcription and editing of audio data using interim text, including a processor of an audio transcription server (ATS) node configured to host a machine learning (ML) module coupled to at least one audio source entity and connected to at least one user-entity node over a network and a memory on which are stored machine-readable instructions that when executed by the processor, cause the processor to: acquire audio data from the at least one audio source entity; parse out the audio data to derive features for beam forming and features for speaker diarization; generate a set of classifiers based on the features for beam forming and the features for speaker diarization; provide the set of classifiers to the ML module configured to generate a predictive model for producing at least one speaker identification parameter; identify the speaker based on the at least one speaker identification parameter; continuously transcribe the audio data to generate an interim text associated with the identified speaker; derive a plurality of labels from the audio data to generate a feature vector; pass the feature vector into the ML module configured to generate a predictive model for producing at least one interim text editing parameter; and provide at least one interim text editing parameter to user-entity node for editing the interim text.

20 Claims, 7 Drawing Sheets

(56)                References Cited

U.S. PATENT DOCUMENTS

| | | | |
|---|---|---|---|
| 11,594,221 B2 * | 2/2023 | Thomson | G10L 15/187 |
| 12,125,487 B2 * | 10/2024 | Bradley | G10L 15/26 |
| 2015/0106091 A1 * | 4/2015 | Wetjen | G10L 15/26 |
| | | | 704/235 |
| 2018/0130484 A1 * | 5/2018 | Dimino, Jr. | H04N 21/234336 |
| 2025/0225338 A1 * | 7/2025 | Lauder | G06F 40/40 |

* cited by examiner

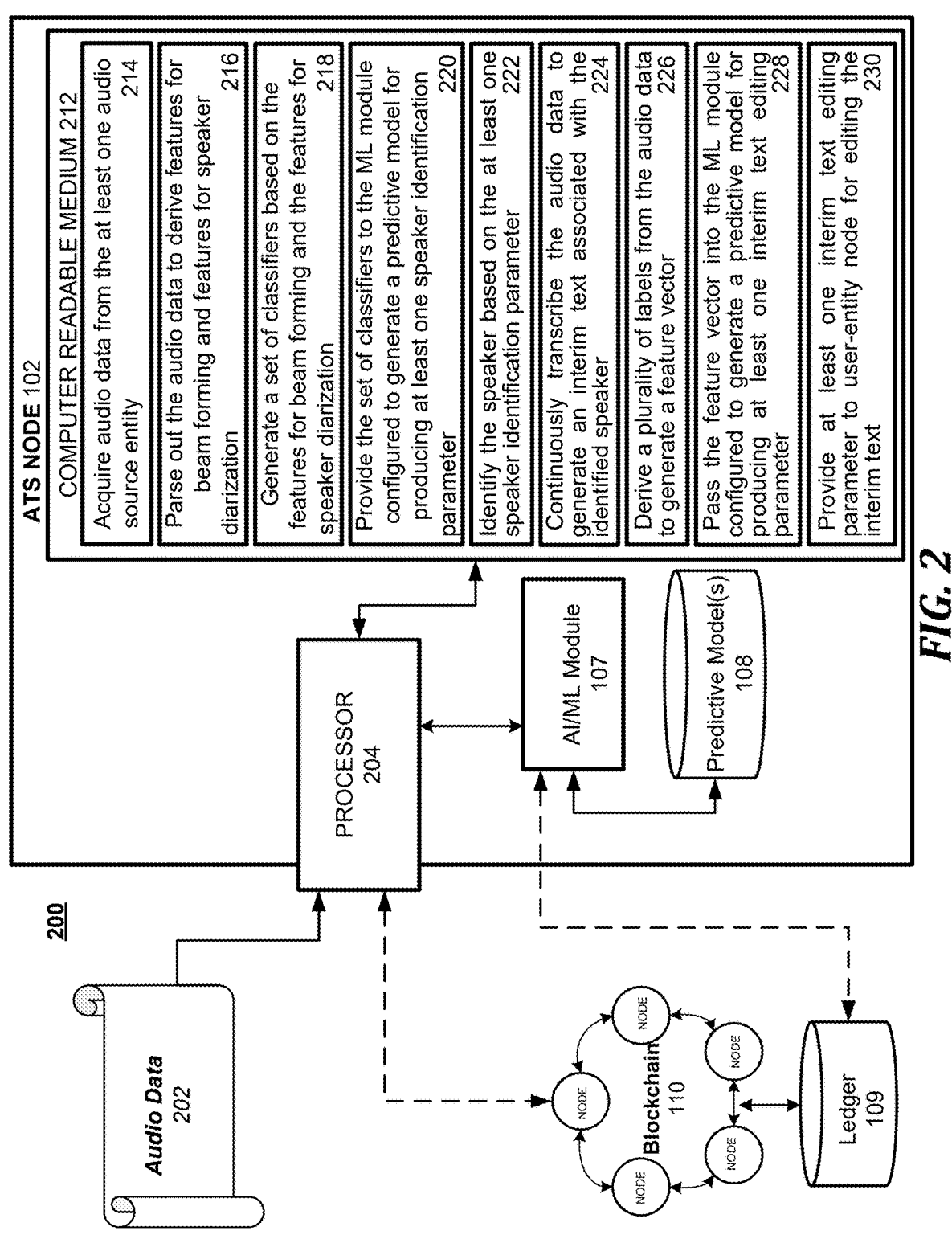

ATS NODE 102

COMPUTER READABLE MEDIUM 212

Acquire audio data from the at least one audio source entity    214

Parse out the audio data to derive features for beam forming and features for speaker diarization    216

Generate a set of classifiers based on the features for beam forming and the features for speaker diarization    218

Provide the set of classifiers to the ML module configured to generate a predictive model for producing at least one speaker identification parameter    220

Identify the speaker based on the at least one speaker identification parameter    222

Continuously transcribe the audio data to generate an interim text associated with the identified speaker    224

Derive a plurality of labels from the audio data to generate a feature vector    226

Pass the feature vector into the ML module configured to generate a predictive model for producing at least one interim text editing parameter    228

Provide at least one interim text editing parameter to user-entity node for editing the interim text    230

PROCESSOR 204

AI/ML Module 107

Predictive Model(s) 108

Audio Data 202

NODE

Blockchain 110

Ledger 109

FIG. 2

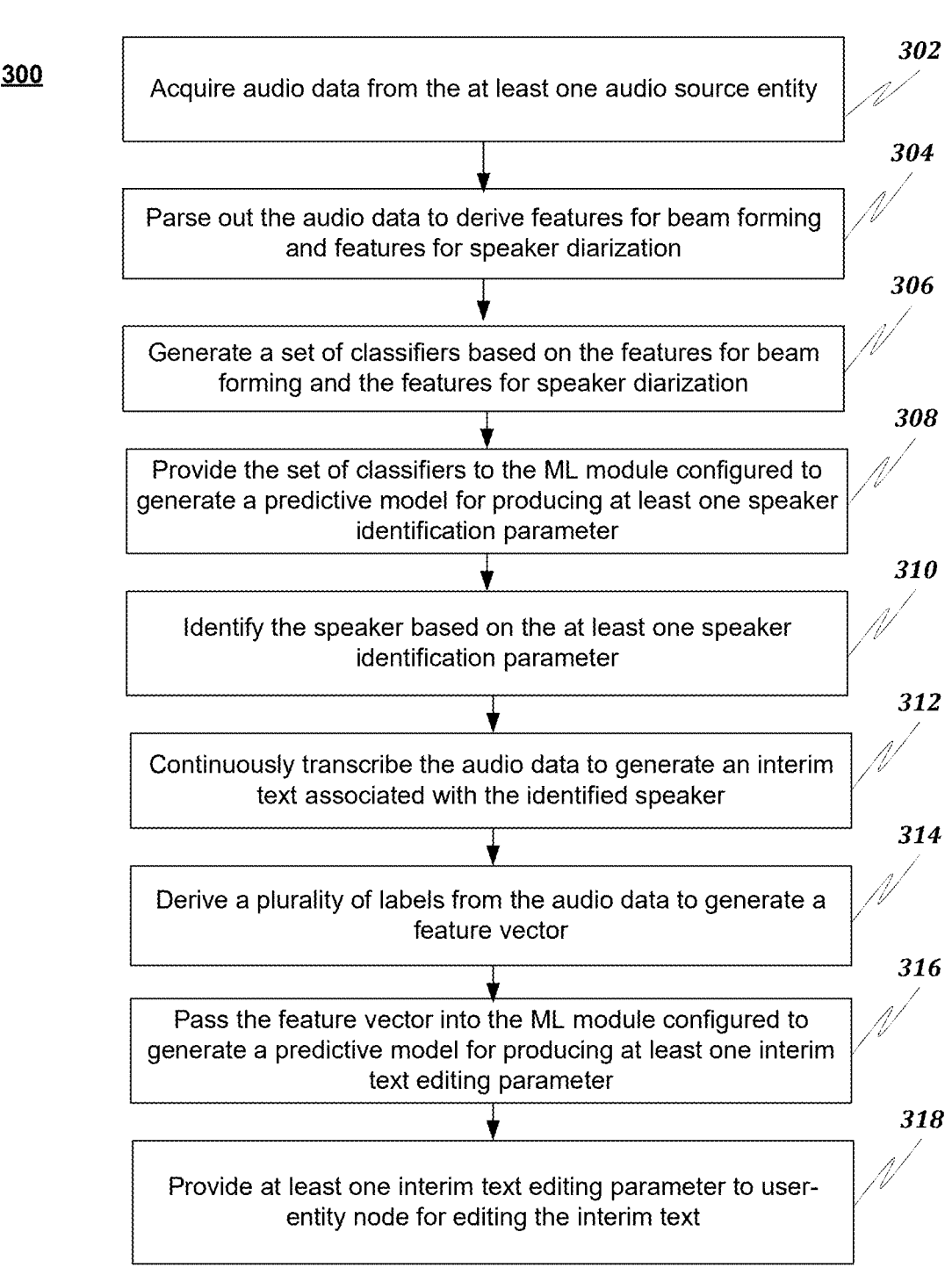

300

302
Acquire audio data from the at least one audio source entity

304
Parse out the audio data to derive features for beam forming and features for speaker diarization 306
Generate a set of classifiers based on the features for beam forming and the features for speaker diarization 308
Provide the set of classifiers to the ML module configured to generate a predictive model for producing at least one speaker identification parameter 310
Identify the speaker based on the at least one speaker identification parameter 312
Continuously transcribe the audio data to generate an interim text associated with the identified speaker 314
Derive a plurality of labels from the audio data to generate a feature vector 316
Pass the feature vector into the ML module configured to generate a predictive model for producing at least one interim text editing parameter 318
Provide at least one interim text editing parameter to user-entity node for editing the interim text

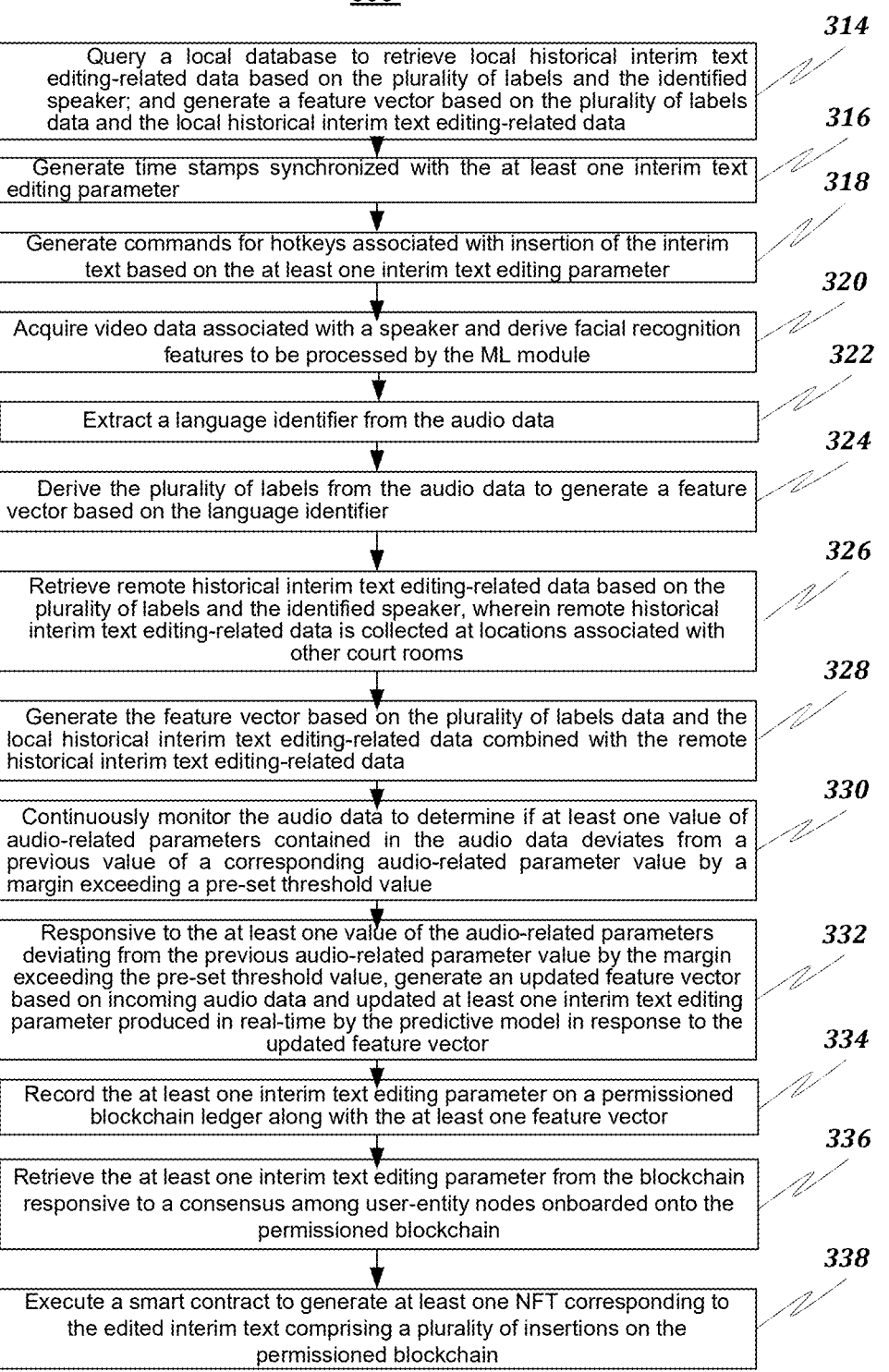

314

Query a local database to retrieve local historical interim text editing-related data based on the plurality of labels and the identified speaker; and generate a feature vector based on the plurality of labels data and the local historical interim text editing-related data

316

Generate time stamps synchronized with the at least one interim text editing parameter

318

Generate commands for hotkeys associated with insertion of the interim text based on the at least one interim text editing parameter

320

Acquire video data associated with a speaker and derive facial recognition features to be processed by the ML module

322

Extract a language identifier from the audio data

324

Derive the plurality of labels from the audio data to generate a feature vector based on the language identifier

326

Retrieve remote historical interim text editing-related data based on the plurality of labels and the identified speaker, wherein remote historical interim text editing-related data is collected at locations associated with other court rooms

328

Generate the feature vector based on the plurality of labels data and the local historical interim text editing-related data combined with the remote historical interim text editing-related data

330

Continuously monitor the audio data to determine if at least one value of audio-related parameters contained in the audio data deviates from a previous value of a corresponding audio-related parameter value by a margin exceeding a pre-set threshold value

332

Responsive to the at least one value of the audio-related parameters deviating from the previous audio-related parameter value by the margin exceeding the pre-set threshold value, generate an updated feature vector based on incoming audio data and updated at least one interim text editing parameter produced in real-time by the predictive model in response to the updated feature vector

334

Record the at least one interim text editing parameter on a permissioned blockchain ledger along with the at least one feature vector

336

Retrieve the at least one interim text editing parameter from the blockchain responsive to a consensus among user-entity nodes onboarded onto the permissioned blockchain

338

Execute a smart contract to generate at least one NFT corresponding to the edited interim text comprising a plurality of insertions on the permissioned blockchain

*FIG. 3B*

400
402
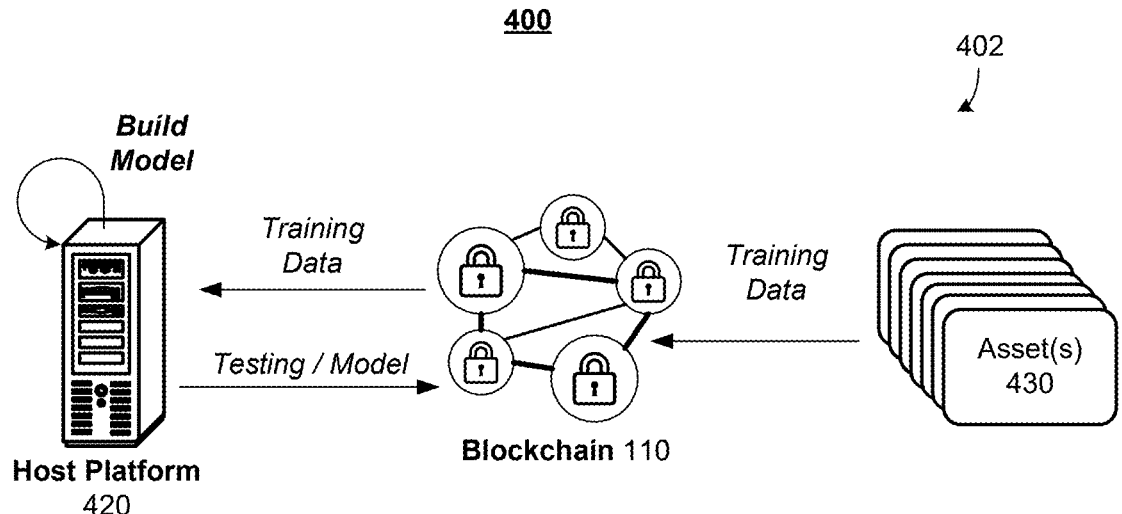
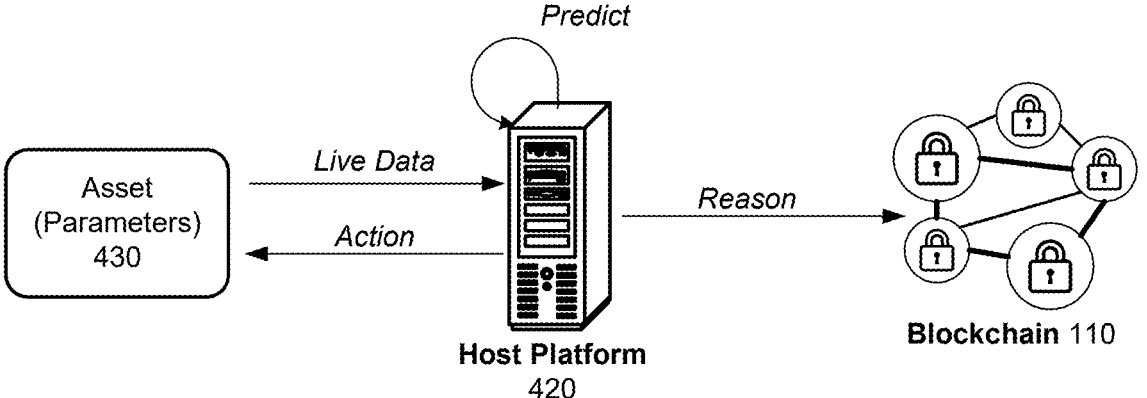
FIG. 4

METHOD AND SYSTEM FOR AI-BASED REAL-TIME TRANSCRIPTION OF AUDIO DATA

FIELD OF DISCLOSURE

The present disclosure generally relates to real-time transcription and editing of spoken audio, and more particularly, to an AI-based automated system and method for real-time transcription and editing of audio data based on interim text data.

BACKGROUND

Many companies offer "Real-time transcription" software applications. However, existing solutions do not allow for editing and speaker identification in the interim text that is still being worked by the speech-to-text recognition application.

For example, the US20100179811A1 discloses detection of occurrences of one or more keywords in audio data are identified using a speech recognizer employing a language model to derive a transcript of the keywords. The transcript is converted into a phoneme sequence. The phonemes of the phoneme sequence are mapped to the audio data to derive a time-aligned phoneme sequence that is searched for occurrences of keyword phoneme sequences corresponding to the phonemes of the keywords.

The US20090319265A1 discloses a system for improving the efficiency of real-time and non-real-time speech transcription by machine speech recognizers, human dictation typists, and human voice writers using speech recognizers. In particular, the pacing with which recorded speech is presented to transcriptionists is automatically adjusted by monitoring the transcriptionists' output by comparing the output acoustically or phonetically to the presented recorded speech as well as monitoring the resulting transcription, and accordingly adjusting the pacing.

The US20070118374A1 discloses a method for detecting and modifying breath pauses in a speech input signal includes detecting breath pauses in a speech input signal; modifying the breath pauses by replacing the breath pauses with a predetermined input and/or attenuating the breath pauses; and outputting an output speech signal.

The U.S. Pat. No. 11,699,456 discloses systems and methods for generating a transcript of a legal proceeding or other multi-speaker conversation or performance in real time or near-real time using multi-channel audio capture. Different speakers or participants in a conversation may each be assigned a separate microphone that is placed in proximity to the given speaker, where each audio channel includes audio captured by a different microphone. Filters may be applied to isolate each channel to include speech utterances of a different speaker, and these filtered channels of audio data may then be processed in parallel to generate speech-to-text results that are interleaved to form a generated transcript.

The U.S. Pat. No. 6,161,087 discloses playback of speech in an audio recording. The method comprises performing full word-level recognition of the speech including recognition of silent pauses and filled pauses, suppressing playback of the filled pauses and silent pauses, alerting a listener of the audio recording to locations of suppressed filled pauses and silent pauses during play back of the audio recording, and accepting a user command to disable suppression of any filled pause or silent pause during playback of the audio recording.

The conventional systems do not use AI-based editing and speaker identification in the interim text. All conventional applications only allow users to edit the final, printed text.

Accordingly, a system and method for AI-based automated real-time transcription and editing of audio data based on interim text data are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for an automated real-time transcription and editing of audio data using interim text, including a processor of an audio transcription server (ATS) node configured to host a machine learning (ML) module coupled to at least one audio source entity and connected to at least one user-entity node over a network and a memory on which are stored machine-readable instructions that when executed by the processor, cause the processor to: acquire audio data from at least one audio source entity; parse out the audio data to derive features for beam forming and features for speaker diarization; generate a set of classifiers based on the features for beam forming and the features for speaker diarization; provide the set of classifiers to the ML module configured to generate a predictive model for producing at least one speaker identification parameter; identify the speaker based on the at least one speaker identification parameter; continuously transcribe the audio data to generate an interim text associated with the identified speaker; derive a plurality of labels from the audio data to generate a feature vector; pass the feature vector into the ML module configured to generate a predictive model for producing at least one interim text editing parameter; and provide at least one interim text editing parameter to user-entity node for editing the interim text.

Another embodiment of the present disclosure provides a method that includes one or more of: acquiring audio data from the at least one audio source entity; parsing out the audio data to derive features for beam forming and features for speaker diarization; generating a set of classifiers based on the features for beam forming and the features for speaker diarization; providing the set of classifiers to the ML module configured to generate a predictive model for producing at least one speaker identification parameter; identifying the speaker based on the at least one speaker identification parameter; continuously transcribing the audio data to generate an interim text associated with the identified speaker; deriving a plurality of labels from the audio data to generate a feature vector; passing the feature vector into the ML module configured to generate a predictive model for producing at least one interim text editing parameter; and providing at least one interim text editing parameter to user-entity node for editing the interim text.

Another embodiment of the present disclosure provides a computer-readable medium including instructions for acquiring audio data from the at least one audio source entity; parsing out the audio data to derive features for beam forming and features for speaker diarization; generating a set of classifiers based on the features for beam forming and the features for speaker diarization; providing the set of classifiers to the ML module configured to generate a predictive model for producing at least one speaker identification parameter; identifying the speaker based on the at least one speaker identification parameter; continuously transcribing the audio data to generate an interim text associated with the identified speaker; deriving a plurality of labels from the audio data to generate a feature vector; passing the feature vector into the ML module configured to generate a predictive model for producing at least one interim text editing parameter; and providing at least one interim text editing parameter to user-entity node for editing the interim text.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 2 illustrates a network diagram of a system including detailed features of an audio transcription server (ATS) node consistent with the present disclosure;

FIG. 3A illustrates a flowchart of a method for an AI-based automated real-time transcription and editing of audio data based on interim text data consistent with the present disclosure;

FIG. 3B illustrates a further flowchart of a method for an AI-based automated real-time transcription and editing of audio data based on interim text data consistent with the present disclosure;

FIG. 4 illustrates deployment of a machine learning model for prediction of interim text editing parameters using blockchain assets consistent with the present disclosure;

DETAILED DESCRIPTION

Figure 1A:
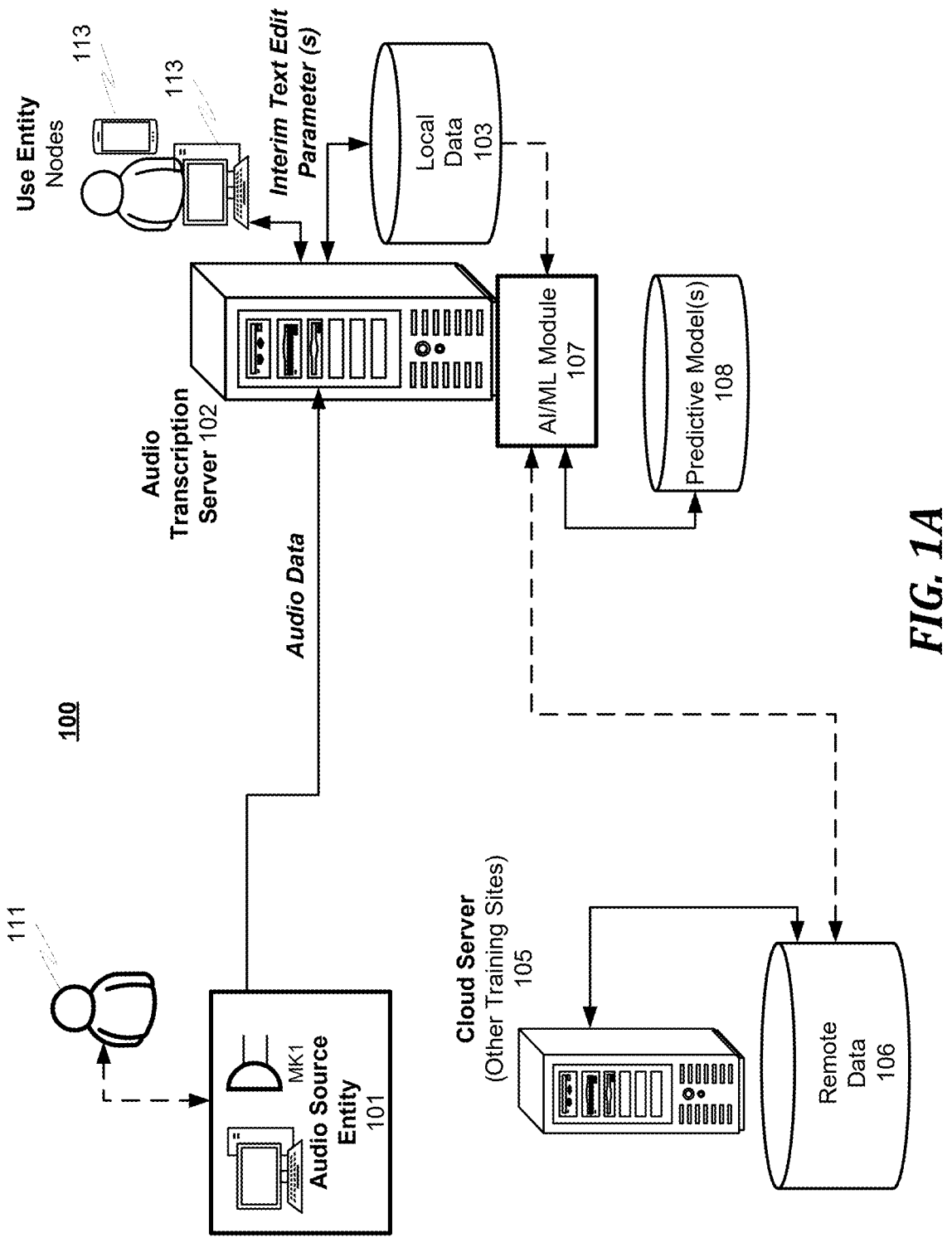
FIG. 1A illustrates a network diagram of a system for an AI-based automated real-time transcription and editing of audio data based on interim text data consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S. C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in the context of the generation of interim text editing parameters, embodiments of the present disclosure are not limited to use only in this context.

The present disclosure provides a system, method and computer-readable medium for an AI-based automated system and method for automated real-time transcription and editing of audio data based on interim text data. In one embodiment, the system overcomes the limitations of existing methods of real-time transcription by employing fine-tuned pre-trained models to extract and process the audio data, irrespective of data format, style, or data type. By leveraging the capabilities of the pre-trained predictive models, the disclosed approach offers a significant improvement over existing solutions discussed above in the background section.

In one embodiment of the present disclosure, the system provides for an AI and machine learning (ML)-generated interim text editing parameters for a chatbot based on analysis of audio data and historical interim text editing-related data. In one embodiment, an automated interim text editing prediction model may be generated to provide for recommendation parameters associated with a speaker associated with the audio data. The automated interim text editing prediction model may use historical interim text editing-related data collected at the current facility location and at other facilities of the same type located within a certain range from the current location or even located globally. The relevant interim text editing-related data may include data related to other speakers having the same characteristics such as language, voice pitch, conditions, language of the jurisdiction, gender of the speaker, etc. The relevant interim text editing-related data may indicate successfully recognized speakers and transcribed audio data.

In one embodiment, to enhance this process, the system may integrate advanced technologies discussed above, such as Artificial Intelligence (AI) and machine-learning (ML) and Blockchain. The AI may be leveraged for several key functions in the manner discussed herein.

Additionally, the disclosed audio transcription system may incorporate Blockchain technology to ensure the transparency and immutability of transactions, providing a secure and trustworthy platform. By embedding these advanced technologies, the disclosed automated AI-based system for real-time transcription and editing of audio data based on interim text data, advantageously, offers a sophisticated and secure solution.

As discussed above, in one disclosed embodiment, the AI/ML technology may be combined with a blockchain technology for secure use of the interim data and editing parameters data. In one embodiment, a blockchain consensus may need to be implemented prior to provision of the final edited interim text to the legal entities. The interim text-related documents and reports may be stored in a form of uniquely minted NFTs on the blockchain ledger.

The disclosed system uniquely combines real-time transcription, synchronized timestamping, hotkey-based speaker annotation, interim text modification, and comprehensive export functionality into a single, integrated tool. This process streamlines the transcription workflow and enhances the accuracy and usability of the transcribed data, making it particularly valuable for applications requiring precise audio-text synchronization, such as legal transcriptions, interviews, and content creation.

In one embodiment, the predictive AI incorporated into the application. The beamforming algorithms and speaker diarization may be used as processes used by the AI to predict speaker identification based on an audio input. The facial recognition technology may also use predictive AI process. In one embodiment, after the initial predictive AI processes have been completed, the user is able to confirm or correct the AI's output via the proprietary GUI.

FIG. 1A illustrates a network diagram of a system for an AI-based automated real-time transcription and editing of audio data based on interim text data consistent with the present disclosure.

Referring to FIG. 1A, the example network 100 includes the Audio Transcription Server (ATS) node 102 connected to a cloud server node(s) 105 over a network. The ATS node 102 is configured to host an AI/ML module 107. The ATS node 102 may receive audio data from the audio source entity node 113 configured to capture audio data from a speaker 111. The ATS node 102 may receive a call or audio data related to communication between the speaker 111 and a courtroom attendees (e.g., attorneys, judge, prosecutors, etc.).

The audio data may have language indicator (or identifier) metadata representing the language of the speaker 111 used during the communication. In one embodiment, the audio data may be processed by the ATS node 102 using the pre-trained large language models. The ATS node 102 may derive the language indicator and parse out the audio data based on the language indicator metadata. In other words, the key features of the audio data may be, advantageously, derived from the audio data based on the language of the speaker 111.

In one embodiment, the language indicator may serve as a kind of a linguistic profile associated with the audio data. The language indicator may guide the AI/ML module 107 in dynamically tailoring the interim text editing parameters for the user 113. Depending on the language indicated, the ATS node 102 could engage specialized language models or apply unique natural language processing techniques optimized for that language.

Regarding the global reach of the disclosed system and method, a cultural intelligence layer may be added to the language indicator. The goal of this layer is for the system to not only recognize the language, but also adapt its recommendations and interactions to be culturally sensitive and appropriate for the speaker 111. In one embodiment, the disclosed system may employ integrated translation capabilities. The language indicator metadata may support and/or trigger this feature, making the system truly globally effective.

The ATS node 102 may query a local database 103 for the historical interim text editing-related data based on the incoming audio data associated with the current audio source entity 101 node. The ATS node 102 may acquire relevant remote historical interim text editing-related data from a remote database 106 residing on the cloud server 105.

The historical interim text editing-related data in the database 106 may be collected from other sites (e.g., courtrooms). The remote historical interim text editing-related data may be collected from the speakers of the same (or similar) type, age, gender, location, language, etc. as the local speaker 111 associated with the audio source entity 101 based in part on data extracted from the incoming audio data.

The ATS node 102 may generate a feature vector or classifier data based on the user audio data and the collected heuristics data (i.e., pre-stored local data 103 and remote data 106). The ATS node 102 may ingest the feature vector/classifier data into an AI/ML module 107. The AI/ML module 107 may generate a predictive model(s) 108 based on the feature vector/classifier data to predict interim text editing parameters for the user entity 113 for editing the interim text. The interim text editing parameters may be further analyzed by the ATS node 102 prior to generation of the actual edited document.

Figure 1B:
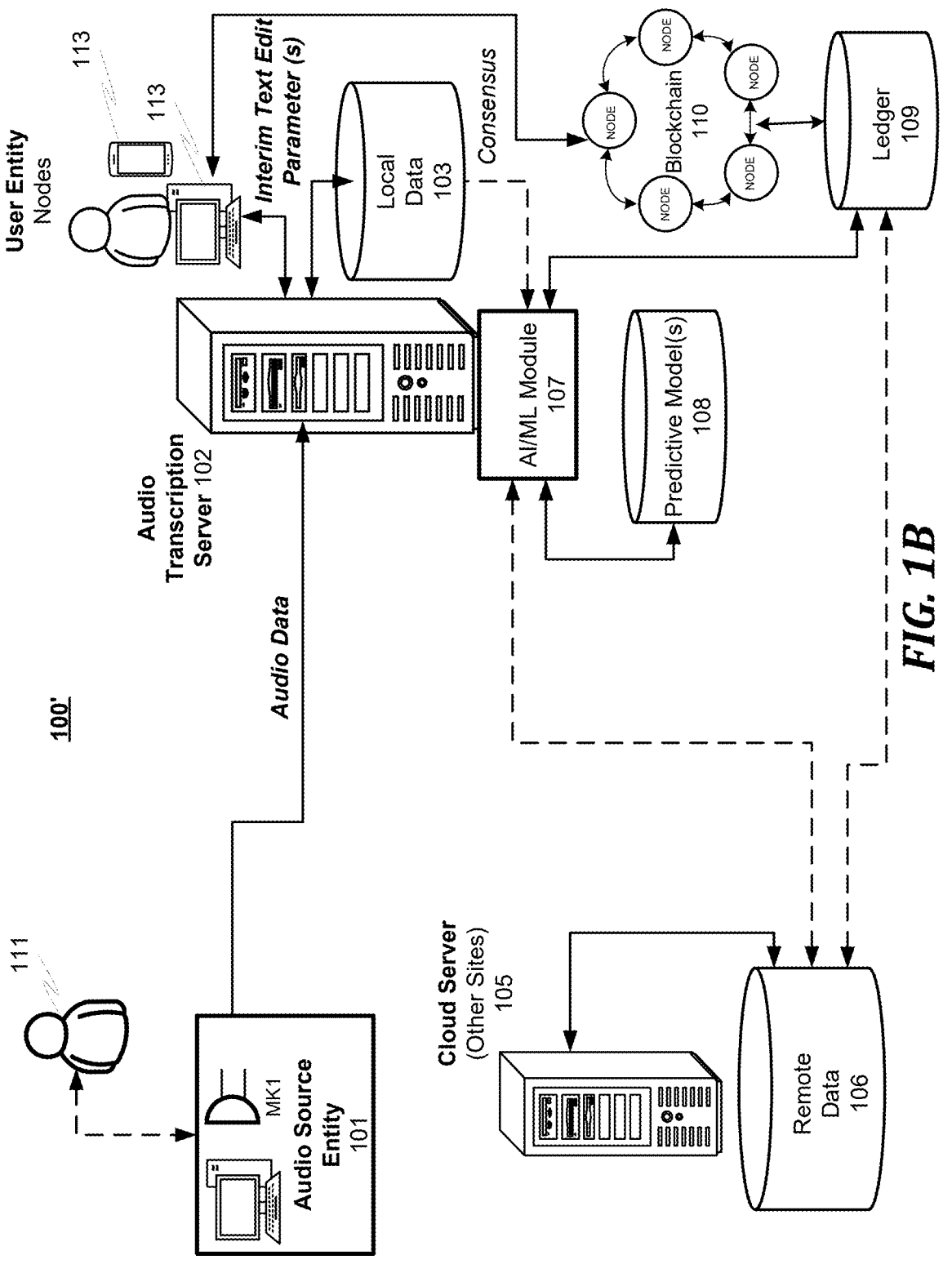
FIG. 1B illustrates a network diagram of a system for an AI-based automated real-time transcription and editing of audio data based on interim text data implemented over a blockchain network consistent with the present disclosure.

FIG. 1B illustrates a network diagram of a system for an AI-based automated real-time transcription and editing of audio data based on interim text data implemented over a blockchain network consistent with the present disclosure.

Referring to FIG. 1B, the example network 100' includes the Audio Transcription Server (ATS) node 102 connected to a cloud server node(s) 105 over a network. The ATS node 102 is configured to host an AI/ML module 107. The ATS node 102 may receive audio data from the audio source entity node 113 configured to capture audio data from a speaker 111. The ATS node 102 may receive a call or audio data related to communication between the speaker 111 and a courtroom attendees (e.g., attorneys, judge, prosecutors, etc.).

The audio data may have language indicator (or identifier) metadata representing the language of the speaker 111 used during the communication. In one embodiment, the audio data may be processed by the ATS node 102 using the pre-trained large language models. The ATS node 102 may derive the language indicator and parse out the audio data based on the language indicator metadata. In other words, the key features of the audio data may be, advantageously, derived from the audio data based on the language of the speaker 111.

In one embodiment, the language indicator may serve as a kind of a linguistic profile associated with the audio data. The language indicator may guide the AI/ML module 107 in dynamically tailoring the interim text editing parameters for the user 113. Depending on the language indicated, the ATS node 102 could engage specialized language models or apply unique natural language processing techniques optimized for that language.

The ATS node 102 may query a local database 103 for the historical interim text editing-related data based on the incoming audio data associated with the current audio source entity 101 node. The ATS node 102 may acquire relevant remote historical interim text editing-related data from a remote database 106 residing on the cloud server 105. The historical interim text editing-related data in the database 106 may be collected from other sites (e.g., courtrooms). The remote historical interim text editing-related data may be collected from the speakers of the same (or similar) type, age, gender, location, language, etc. as the local speaker 111 associated with the audio source entity 101 based in part on data extracted from the incoming audio data.

The ATS node 102 may generate a feature vector or classifier data based on the user audio data and the collected heuristics data (i.e., pre-stored local data 103 and remote data 106). The ATS node 102 may ingest the feature vector/classifier data into an AI/ML module 107. The AI/ML module 107 may generate a predictive model(s) 108 based on the feature vector/classifier data to predict interim text editing parameters for the user entity 113 for editing the interim text. The interim text editing parameters may be further analyzed by the ATS node 102 prior to generation of the actual edited document.

In one embodiment, the ATS node 102 may receive the interim text editing parameters from a permissioned blockchain 110 ledger 109 based on a consensus from the user entity nodes 113 for approving or allowing the edits of the interim text. Additionally, confidential historical speaker-related information and previous speakers'-related interim text editing parameters may also be acquired from the permissioned blockchain 110. The newly features of the audio data with corresponding predicted interim text editing parameters data may be also recorded on the ledger 109 of the blockchain 110 so it can be used as training data for the predictive model(s) 108.

In this implementation the ATS node 102, the cloud server 105, the user entity nodes 113 and the audio source entities(s) 101 may serve as blockchain 110 peer nodes. In one embodiment, local data from the database 103 and remote data from the database 106 may be duplicated on the blockchain ledger 109 for higher security of storage.

The AI/ML module 107 may generate a predictive model(s) 108 to predict the interim text editing parameters for the user(s) 113 in response to the specific relevant pre-stored speaker-related data acquired from the blockchain 110 ledger 109. This way, the current interim text editing parameters may be predicted based not only on the current audio source entity 101-related data, but also based on the previously collected heuristics. This way, the most optimal way of editing the interim text may be included into the predictive recommendations. After the audio data processing and editing is completed, the related documents may be converted into unique secure NFT assets to be recorded on the blockchain to be used for future models' training.

In one embodiment, as a second round of approval, a blockchain consensus may be achieved among the user entities 113 in order to approve the editing parameters generated by the ATS node 102.

In one embodiment, the speaker identification may include recording of speaker's video in addition to the audio data and cross-referencing the facial recognition from the video against the beamforming of omnidirectional sound derived from the audio data for a more accurate speaker identification. In one example, the system may employ a 360-room camera that records omnidirectional sound in conjunction with the speaker diarization.

In one embodiment, the ATS node 102 may implement an automatic transcript formatting based on state laws and legal regulations. Each state has specific guidelines for their court transcripts such as font, spacing, lines per page, etc. The ATS node 102 may receive a user selection of the state and may have the transcript auto-formatted to the state specifications prior to exporting the transcript.

FIG. 2 illustrates a network diagram of a system including detailed features of an audio transcription server (ATS) node consistent with the present disclosure.

Referring to FIG. 2, the example network 200 includes the ATS node 102 connected to the audio source entity 101 and to the user entity node(s) 113 (see FIGS. 1A-B) to receive the audio data 202 associated with the speaker 111. The ATS node 102 is configured to host an AI/ML module 107. As discussed above with respect to FIGS. 1A-B, the ATS node 102 may receive the audio data 202 and pre-stored historical interim text editing-related data retrieved from the local and remote databases. As discussed above, the pre-stored historical interim text editing-related data may be retrieved from the ledger 109 of the blockchain 110.

The AI/ML module 107 may generate a predictive model(s) 108 based on the received audio data 202 provided by the ATS node 102. As discussed above, the AI/ML module 107 may provide predictive outputs data in the form of interim text editing parameters for editing of the interim text by the user(s) entities 113 (see FIG. 1B). The ATS node 102 may process the predictive outputs data received from the AI/ML module 107 to generate the editing recommendations for the user of the entities 113.

In one embodiment, the ATS node 102 may continually monitor the audio and may detect a parameter that deviates from a previous recorded parameter (or from a median reading value) by a margin that exceeds a threshold value pre-set for this particular parameter. For example, if speaker's 111 tone or speed or pauses change significantly, this may cause a change in interim text editing recommendations provided to user entity 113. Accordingly, once the threshold is met or exceeded by at least one parameter, the ATS node 102 may provide the currently acquired audio data-related parameter to the AI/ML module 107 to generate an updated interim text editing parameters for the user entity 113 based on the current incoming audio data.

While this example describes in detail only one ATS node 102, multiple such nodes may be connected to the network and to the blockchain 110. It should be understood that the ATS node 102 may include additional components and that some of the components described herein may be removed and/or modified without departing from a scope of the ATS node 102 disclosed herein. The ATS node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the ATS node 102 may include multiple processors, multiple cores, or the like, without departing from the scope of the ATS node 102 system.

The ATS node 102 may also include a non-transitory computer readable medium 212 that may have stored thereon machine-readable instructions executable by the processor 204. Examples of the machine-readable instructions are shown as 214-222 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to acquire audio data from the at least one audio source entity 101 (FIG. 1A-B). The processor 204 may fetch, decode, and execute the machine-readable instructions 216 to parse out the audio data to derive features for beam forming and features for speaker diarization. The processor 204 may fetch, decode, and execute the machine-readable instructions 218 to generate a set of classifiers based on the features for beam forming and the features for speaker diarization. The processor 204 may fetch, decode, and execute the machine-readable instructions 220 to provide the set of classifiers to the ML module configured to generate a predictive model for producing at least one speaker identification parameter.

The processor 204 may fetch, decode, and execute the machine-readable instructions 222 to identify the speaker based on the at least one speaker identification parameter. The processor 204 may fetch, decode, and execute the machine-readable instructions 224 to continuously transcribe the audio data to generate an interim text associated with the identified speaker The processor 204 may fetch, decode, and execute the machine-readable instructions 226 to derive a plurality of labels from the audio data to generate a feature vector. The processor 204 may fetch, decode, and execute the machine-readable instructions 228 to pass the feature vector into the ML module configured to generate a predictive model for producing at least one interim text editing parameter. The processor 204 may fetch, decode, and execute the machine-readable instructions 230 to provide at least one interim text editing parameter to user-entity node 113 for editing the interim text.

As a non-limiting example, the consensual approval of the edited interim text may be associated with a request for additional data such as proof of corrected speaker 111 statements, etc. The permissioned blockchain 110 may be configured to use one or more smart contracts that manage transactions for multiple participating nodes and for recording the transactions on the ledger 109.

FIG. 3A illustrates a flowchart of a method for an AI-based automated real-time transcription and editing of audio data based on interim text data consistent with the present disclosure.

Referring to FIG. 3A, the method 300 may include one or more of the steps described below. FIG. 3A illustrates a flow chart of an example method executed by the ATS node 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the ATS node 102 may execute some or all of the operations included in the method 300.

With reference to FIG. 3A, at block 302, the processor 204 may acquire audio data from the at least one audio source entity. At block 304, the processor 204 may parse out the audio data to derive features for beam forming and features for speaker diarization. At block 306, the processor 204 may generate a set of classifiers based on the features for beam forming and the features for speaker diarization. At block 308, the processor 204 may provide the set of classifiers to the ML module configured to generate a predictive model for producing at least one speaker identification parameter. At block 310, the processor 204 may identify the speaker based on the at least one speaker identification parameter. At block 312, the processor 204 may continuously transcribe the audio data to generate an interim text associated with the identified speaker. At block 314, the processor 204 may derive a plurality of labels from the audio data to generate a feature vector. At block 316, the processor 204 may pass the feature vector into the ML module configured to generate a predictive model for producing at least one interim text editing parameter. At block 318, the processor 204 may provide at least one interim text editing parameter to user-entity node for editing the interim text.

FIG. 3B illustrates a further flowchart of a method for an AI-based automated real-time transcription and editing of audio data based on interim text data consistent with the present disclosure.

Referring to FIG. 3B, the method 300' may include one or more of the steps described below. FIG. 3B illustrates a flow chart of an example method executed by the ATS node 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the ATS 102 may execute some or all of the operations included in the method 300'.

With reference to FIG. 3B, at block 314, the processor 204 may query a local database to retrieve local historical interim text editing-related data based on the plurality of labels and the identified speaker and may generate a feature vector based on the plurality of labels data and the local historical interim text editing-related data.

At block 316, the processor 204 may generate time stamps synchronized with the at least one interim text editing parameter. At block 318, the processor 204 may generate commands for hotkeys associated with insertion of the interim text based on the at least one interim text editing parameter. At block 320, the processor 204 may acquire video data associated with a speaker and derive facial recognition features to be processed by the ML module. At block 322, the processor 204 may extract a language identifier from the audio data.

At block 324, the processor 204 may derive the plurality of labels from the audio data to generate a feature vector based on the language identifier. At block 326, the processor 204 may retrieve remote historical interim text editing-related data based on the plurality of labels and the identified speaker, wherein remote historical interim text editing-related data is collected at locations associated with other court rooms. At block 328, the processor 204 may generate the feature vector based on the plurality of labels data and the local historical interim text editing-related data combined with the remote historical interim text editing-related data. At block 330, the processor 204 may continuously monitor the audio data to determine if at least one value of audio-related parameters contained in the audio data deviates from a previous value of a corresponding audio-related parameter value by a margin exceeding a pre-set threshold value.

At block 332, the processor 204 may, responsive to the at least one value of the audio-related parameters deviating from the previous audio-related parameter value by the margin exceeding the pre-set threshold value, generate an updated feature vector based on incoming audio data and updated at least one interim text editing parameter produced in real-time by the predictive model in response to the updated feature vector. At block 334, the processor 204 may record the at least one interim text editing parameter on a permissioned blockchain ledger along with the at least one feature vector.

At block 336, the processor 204 may retrieve the at least one interim text editing parameter from the blockchain responsive to a consensus among user-entity nodes onboarded onto the permissioned blockchain. At block 338, the processor 204 may execute a smart contract to generate at least one NFT corresponding to the edited interim text comprising a plurality of insertions on the permissioned blockchain.

In one disclosed embodiment, the recommendation parameters' model may be generated by the AI/ML module 107 that may use training data sets to improve accuracy of the prediction of the interim text editing parameters user entities 113 (FIG. 1A). The interim text editing parameters used in training data sets may be stored in a centralized local database (such as one used for storing local data 103 depicted in FIG. 1A). In one embodiment, a neural network may be used in the AI/ML module 107 for interim text editing parameters' modeling.

In another embodiment, the AI/ML module 107 may use a decentralized storage such as a blockchain 110 (see FIG. 1B) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 101, 113, 105 and 102 (FIG. 1B) may execute a consensus protocol to validate blockchain 110 storage transactions, group the storage transactions into blocks, and build a hash chain over the blocks. This process forms the ledger 109 by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing recommendation parameters, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

In the example depicted in FIG. 4, a host platform 420 (such as the ATS node 102) builds and deploys a machine learning model for predictive monitoring of assets 430. Here, the host platform 420 may be a cloud platform, an industrial server, a web server, a personal computer, a user device, and the like. Assets 430 can represent text editing parameters. The blockchain 110 can be used to significantly improve both a training process 402 of the machine learning model and the text editing parameters'predictive process 405 based on a trained machine learning model. For example, in 402, rather than requiring a data scientist/ engineer or other user to collect the data, historical data (heuristics—i.e., interim text editing-related data) may be stored by the assets 430 themselves (or through an intermediary, not shown) on the blockchain 110.

This can significantly reduce the collection time needed by the host platform 420 when performing predictive model training. For example, using smart contracts, data can be directly and reliably transferred straight from its place of origin (e.g., from the ATS node 102 or from databases 103 and 106 depicted in FIGS. 1A-1B) to the blockchain 110. By using the blockchain 110 to ensure the security and ownership of the collected data, smart contracts may directly send the data from the assets to the entities that use the data for building a machine learning model. This allows for sharing of data among the assets 430. The collected data may be stored in the blockchain 110 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure.

Furthermore, training of the machine learning model on the collected data may take rounds of refinement and testing by the host platform 420. Each round may be based on additional data or data that was not previously considered to help expand the knowledge of the machine learning model. In 402, the different training and testing steps (and the data associated therewith) may be stored on the blockchain 110 by the host platform 420. Each refinement of the machine learning model (e.g., changes in variables, weights, etc.) may be stored on the blockchain 110. This, advantageously, provides verifiable proof of how the model was trained and what data was used to train the model. Furthermore, when the host platform 420 has achieved a finally trained model, the resulting model itself may be stored on the blockchain 110.

After the model has been trained, it may be deployed to a live environment where it can make recommendation-related predictions/decisions based on the execution of the final trained machine learning model using the prediction parameters. In this example, data fed back from the asset 430 may be input into the machine learning model and may be used to make event predictions such as interim text editing parameters based on the recorded audio-related data. Determinations made by the execution of the machine learning model (e.g., approval of edits, etc.) at the host platform 420 may be stored on the blockchain 110 to provide auditable/verifiable proof. As one non-limiting example, the machine learning model may predict a future change of a part of the asset 430 (the interim text editing parameters or recommendations). The data behind this decision may be stored by the host platform 420 on the blockchain 110.

The application supported by the disclosed embodiments may have the following features.

Users interact with GUI (Graphical User Interface) created using Tinkter as follows:
  a. Users set speakers, exhibits, and hot keys using the GUI.
  b. Users select audio and video inputs using the GUI.
  c. Users start and stop transcription and recording buttons using the GUI.

d. Users select state the proceeding is taking place in using the GUI.
  e. Interim text is displayed in text box 1.
  f. Final text is printed in text box 2.
  g. 360 video is displayed in the video window.
  h. Users able to attend proceeding virtually using oculus or similar VR headset.

A hardware device 360 camera with omni-directional audio microphones may be setup in the middle of the conference room or courtroom.
  a. The camera captures video from all directions using multiple sensors, stitching the footage together to create a seamless 360-degree view.
  b. The camera is equipped with multiple microphones to capture audio from different directions. These microphones help in isolating and identifying the direction of the sound source.

Audio Recording may be implemented as follows:
  a. The application uses beamforming algorithms that focus on the sound coming from a particular direction while suppressing noise from other directions. It helps in isolating the voice of the person speaking.
  b. The application uses speaker diarization algorithms which analyze audio to segment and label parts of the audio signal according to who is speaking.
  c. The application may use PyAudio to capture audio from the selected microphone.
  d. The audio data is stored in "frames".
  e. The audio is run through a noise suppression plug-in that removes background noises and isolates voices.

Video Recording is implemented as follows:
  a. The application captures video input from a 360-degree camera.
  b. Facial recognition technology is used to detect and identify faces in the video feed.

This recognition can be based on pre-enrolled faces (known face templates) or can work in real-time to distinguish different individuals.
  c. Video data is recorded and stored as an .mp4.

Integration of Audio and Video Data is implemented as follows:
  a. Video frames and audio streams are synchronized by timecode.
  b. The system integrates audio and video data to determine which face is associated with the identified voice.
  c. By analyzing the direction of the sound and matching it with the faces in that direction, the system can accurately identify who is speaking.

Transcription is implemented as follows:
  a. The "transcribe_streaming" function streams the de-noised audio data to the speech-to-text API.
  b. The transcription results are updated in real-time and displayed in the interim text box.
  c. The combined audio/video data allows the system to identify who is speaking at any given moment. The system can display a visual indicator (e.g., highlighting the speaker's face) in the video feed.
  d. Speaker names are identified and added to the interim text.
  e. Users can correct or override the predictive, software generated speaker names, add note, annotations, or make modifications to interim text before it becomes final text.
  f. Final text is printed and displayed in the final text box.
  g. User can scroll, edit, and make corrections to final transcript.

h. The transcript text is an interactive timeline. Users can click on any word in the text and play back the synchronized audio and video from that point on.

Formatting is implemented as follows:

Leal transcript Formatting is applied to final text box to exact specifications of state selected by user.

File Operations are implemented as follows:

a. Speaker and exhibit information, as well as transcripts, are saved to JSON and text files.

b. Transcripts, audio recordings, and video recordings can be exported to a specified directory and filetype.

Ent-to-end Encryption: E2EE is handled at several stages of the application process.

a. During Audio and Video Capture:

i. Encryption at Capture: audio and video data may be encrypted as soon as it is captured by the 360 camera and microphones. This prevents any unauthorized access during data transmission.

ii. Implementation of encryption libraries, such as PyCryptodome in Python, may be used to encrypt data streams.

b. During Transmission to Cloud Services:

i. Secure Data Transmission: When sending audio data to Google Cloud Speech-to-Text or video frames to facial recognition services, secure transmission protocols (e.g., HTTPS) are used to ensure data is encrypted in transit.

ii. Implementation: TLS (Transport Layer Security) is utilized for secure HTTP requests.

c. While Storing Data Locally:

i. Encrypted Storage: captured and processed data (e.g., audio recordings, transcripts, facial recognition results) are stored in an encrypted format to prevent unauthorized access.

ii. Implementation: encryption libraries are used to encrypt files before saving them to disk.

d. During Processing:

i. In-Memory Encryption: data remains encrypted in memory while being processed and is only decrypted when absolutely necessary.

ii. Implementation: secure memory handling techniques are used to protect sensitive data during processing.

e. Exporting Data:

i. Encrypted Exports: When exporting transcripts and recordings, the files are encrypted before packaging them for export.

ii. Implementation: encryption tools are used to create encrypted zip files for export.

As discussed above, in one embodiment, the features and/or the actions described and/or depicted herein can occur on or with respect to the blockchain 110. The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
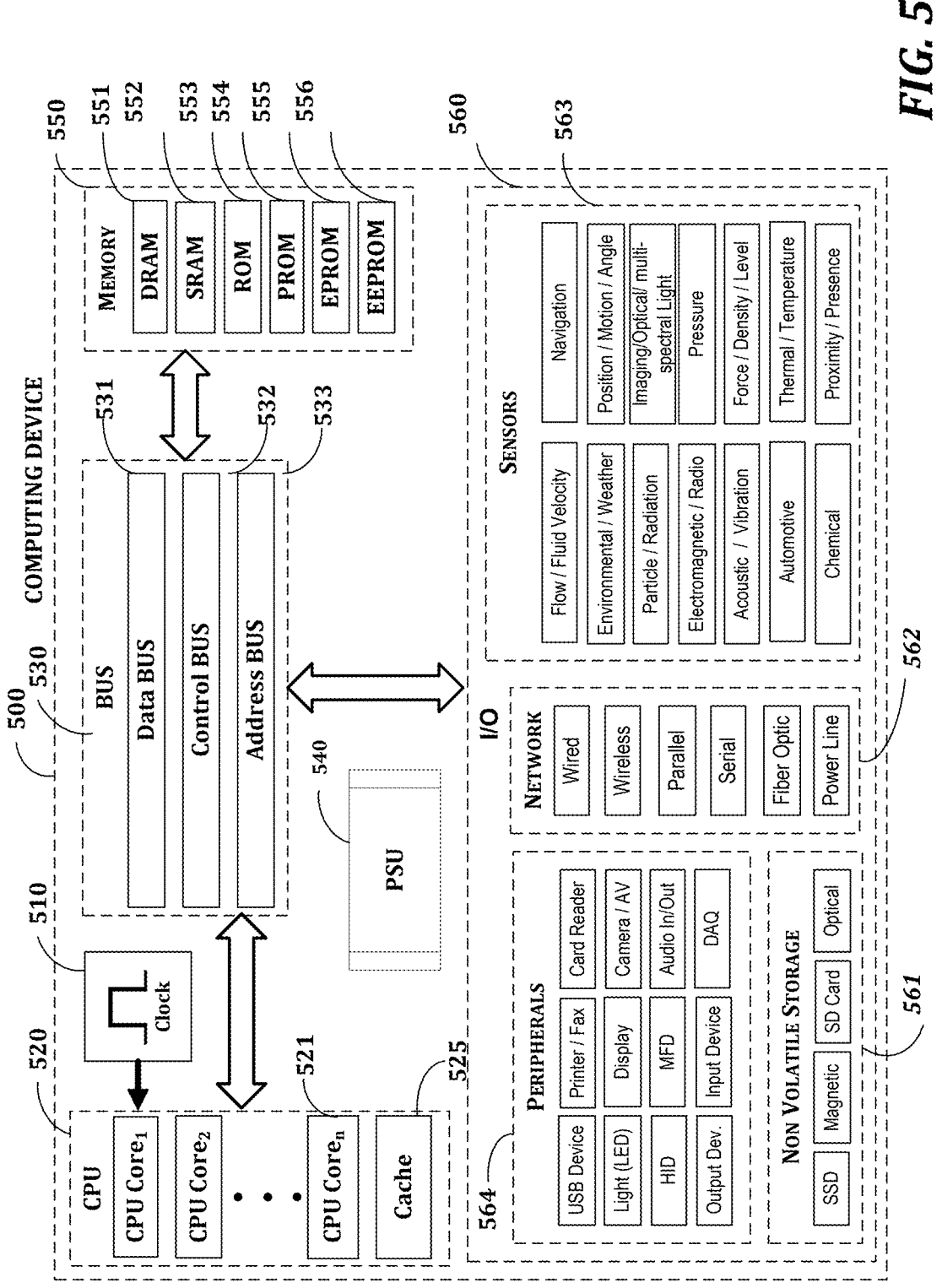
FIG. 5 illustrates a block diagram of a system including a computing device for performing the method of FIGS. 3A and 3B.

FIG. 5 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The ATS node 102 (see FIG. 2) may be hosted on a centralized server or on a cloud computing service. Although method 300 has been described to be performed by the ATS node 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the ATS node 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus

Control bus 532

Address bus 533

System Management Bus (SMBus)

Front-Side-Bus (FSB)

External Bus Interface (EBI)

Local bus

Expansion bus

Lightning bus

Controller Area Network (CAN bus)

Camera Link

ExpressCard

Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)

HyperTransport

InfiniBand

RapidIO

Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).

Music Instrument Digital Interface (MIDI)

Universal Serial Bus (USB), including embodiments such as, but not limited to, Media Transfer Protocol (MTP)/ Mobile High-Definition Link (MHL), Device Firmware Upgrade (DFU), wireless USB, InterChip USB, IEEE 1395 Interface/Firewire, Thunderbolt, and eXtensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, Compact-Flash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G,5G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photo-switch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A system for an automated real-time transcription and editing of audio data using interim text, comprising:

a processor of an audio transcription server (ATS) node configured to host a machine learning (ML) module coupled to at least one audio source entity and connected to at least one user-entity node over a network; and a memory on which are stored machine-readable instructions that when executed by the processor, cause the processor to:

acquire audio data from the at least one audio source entity;

parse out the audio data to derive features for beam forming and features for speaker diarization;

generate a set of classifiers based on the features for beam forming and the features for speaker diarization;

provide the set of classifiers to the ML module configured to generate a predictive model for producing at least one speaker identification parameter;

identify the speaker based on the at least one speaker identification parameter;

continuously transcribe the audio data to generate an interim text associated with the identified speaker;

derive a plurality of labels from the audio data to generate a feature vector;

pass the feature vector into the ML module configured to generate a predictive model for producing at least one interim text editing parameter; and provide at least one interim text editing parameter to user-entity node for editing the interim text.

2. The system of claim 1, wherein the machine-readable instructions that when executed by the processor, cause the processor to:

query a local database to retrieve local historical interim text editing-related data based on the plurality of labels and the identified speaker; and generate a feature vector based on the plurality of labels data and the local historical interim text editing-related data.

3. The system of claim 1, wherein the machine-readable instructions that when executed by the processor, cause the processor to generate time stamps synchronized with the at least one interim text editing parameter.

4. The system of claim 1, wherein the machine-readable instructions that when executed by the processor, cause the processor to generate commands for hotkeys associated with insertion of the interim text based on the at least one interim text editing parameter.

5. The system of claim 1, wherein the machine-readable instructions that when executed by the processor, cause the processor to acquire video data associated with a speaker and derive facial recognition features to be processed by the ML module.

6. The system of claim 1, wherein the machine-readable instructions that when executed by the processor, cause the processor to extract a language identifier from the audio data.

7. The system of claim 6, wherein the machine-readable instructions that when executed by the processor, cause the processor to derive the plurality of labels from the audio data to generate a feature vector based on the language identifier.

8. The system of claim 2, wherein the machine-readable instructions that when executed by the processor, cause the processor to retrieve remote historical interim text editing-related data based on the plurality of labels and the identified speaker, wherein remote historical interim text editing-related data is collected at locations associated with other court rooms.

9. The system of claim 8, wherein the machine-readable instructions that when executed by the processor, cause the processor to generate the feature vector based on the plurality of labels data and the local historical interim text editing-related data combined with the remote historical interim text editing-related data.

10. The system of claim 1, wherein the machine-readable instructions that when executed by the processor, cause the processor to continuously monitor the audio data to determine if at least one value of audio-related parameters contained in the audio data deviates from a previous value of a corresponding audio-related parameter value by a margin exceeding a pre-set threshold value.

11. The system of claim 10, wherein the machine-readable instructions that when executed by the processor, cause the processor to, responsive to the at least one value of the audio-related parameters deviating from the previous audio-related parameter value by the margin exceeding the pre-set threshold value, generate an updated feature vector based on incoming audio data and updated at least one interim text editing parameter produced in real-time by the predictive model in response to the updated feature vector.

12. The system of claim 1, wherein the machine-readable instructions that when executed by the processor, further cause the processor to record the at least one interim text editing parameter on a permissioned blockchain ledger along with the at least one feature vector.

13. The system of claim 12, wherein the machine-readable instructions that when executed by the processor, further cause the processor to retrieve the at least one interim text editing parameter from the blockchain responsive to a consensus among user-entity nodes onboarded onto the permissioned blockchain.

14. The system of claim 12, wherein the machine-readable instructions that when executed by the processor, further cause the processor to execute a smart contract to generate at least one NFT corresponding to the edited interim text comprising a plurality of insertions on the permissioned blockchain.

15. A method for an automated real-time transcription and editing of audio data using interim text, comprising:

acquiring, by an audio transcription server (ATS) node, audio data from the at least one audio source entity;

parsing out, by the ATS node, the audio data to derive features for beam forming and features for speaker diarization;

generating, by the ATS node, a set of classifiers based on the features for beam forming and the features for speaker diarization;

providing, by the ATS node, the set of classifiers to a machine learning module configured to generate a predictive model for producing at least one speaker identification parameter;

identifying, by the ATS node, the speaker based on the at least one speaker identification parameter;

continuously transcribing, by the ATS node, the audio data to generate an interim text associated with the identified speaker;

deriving, by the ATS node, a plurality of labels from the audio data to generate a feature vector;

passing, by the ATS node, the feature vector into the ML module configured to generate a predictive model for producing at least one interim text editing parameter; and providing, by the ATS node, at least one interim text editing parameter to user-entity node for editing the interim text.

16. The method of claim 15, further comprising:

querying a local database to retrieve local historical interim text editing-related data based on the plurality of labels and the identified speaker; and generating a feature vector based on the plurality of labels data and the local historical interim text editing-related data.

17. The method of claim 15, further comprising retrieving remote historical interim text editing-related data based on the plurality of labels and the identified speaker, wherein remote historical interim text editing-related data is collected at locations associated with other court rooms.

18. The method of claim 17, further comprising generating the feature vector based on the plurality of labels data and the local historical interim text editing-related data combined with the remote historical interim text editing-related data.

19. The method of claim 15, further comprising:

continuously monitoring the audio data to determine if at least one value of audio-related parameters contained in the audio data deviates from a previous value of a corresponding audio-related parameter value by a margin exceeding a pre-set threshold value; and responsive to the at least one value of the audio-related parameters deviating from the previous audio-related parameter value by the margin exceeding the pre-set threshold value, generating an updated feature vector based on incoming audio data and updated at least one interim text editing parameter produced in real-time by the predictive model in response to the updated feature vector.

20. A non-transitory computer-readable medium comprising instructions, that when read by a processor, cause the processor to perform:

acquiring audio data from the at least one audio source entity;

parsing out the audio data to derive features for beam forming and features for speaker diarization;

generating a set of classifiers based on the features for beam forming and the features for speaker diarization;

providing the set of classifiers to a machine learning module configured to generate a predictive model for producing at least one speaker identification parameter;

identifying the speaker based on the at least one speaker identification parameter;

continuously transcribing the audio data to generate an interim text associated with the identified speaker;

deriving a plurality of labels from the audio data to generate a feature vector;

passing the feature vector into the ML module configured to generate a predictive model for producing at least one interim text editing parameter; and providing at least one interim text editing parameter to user-entity node for editing the interim text.

* * * * *